Sept. 17, 1968  W. TIRASPOLSKY  3,401,528
SUBAQUEOUS HYDRAULIC ACCUMULATORS
Filed June 7, 1966  2 Sheets-Sheet 1
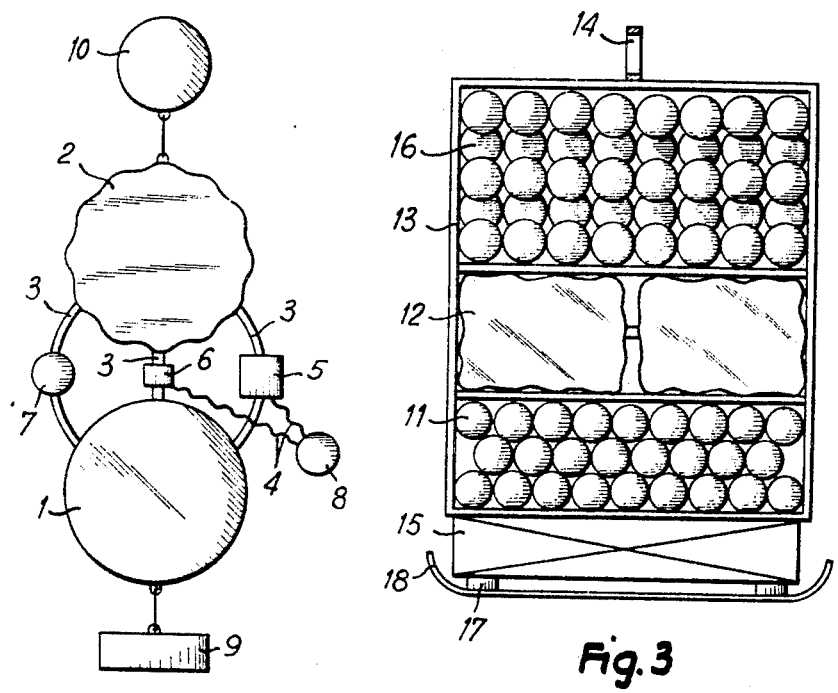
Fig.1
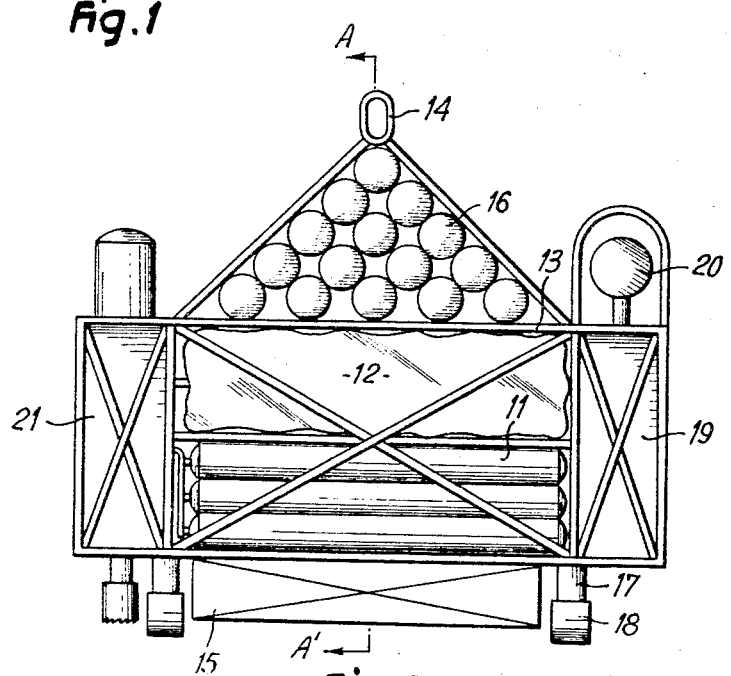
Fig.3
Fig.2

United States Patent Office 3,401,528
Patented Sept. 17, 1968

3,401,528
SUBAQUEOUS HYDRAULIC ACCUMULATORS
Wladimir Tiraspolsky, 69 Ave. Victor Cresson,
Issy-les-Moulineaux, Hauts-de-Seine, France
Filed June 7, 1966, Ser. No. 555,800
Claims priority, application France, June 11, 1965,
20,453
12 Claims. (Cl. 61—69)

ABSTRACT OF THE DISCLOSURE

A subaqueous hydraulic accumulator for the purpose of creating usable energy at underwater locations, preferably at considerable depths, which utilizes the energy created by hydraulic fluid pressurized by the ambient hydraulic pressure flowing through an energy producing device into a low pressure reservoir. The pressurized fluid energizing the energy producing device may be stored within a compressible and expansible chamber reservoir, or may consist of the sea water surrounding the apparatus.

---

The invention pertains to techniques and implements or tool utilizable under subaqueous conditions.

Attempts are currently being made for subaqueous locomotive means and for operating means, to reach a maximum of autonomy particularly in off-shore locations for gaining freedom from surface vessels and limitations.

One of the basic problems in underwater work is the supplying of energy to subaqueous installations and plants.

Conventional energy supplying means such as air under pressure, electric current fed by a conductor, batteries incorporated with the installation, thermal engines and in the proximate future, nuclear plants all suffer from disadvantages and limitations.

While the use of such conventional means offers no unsurmountable barriers at such depths at which present work is conducted i.e. less than two hundred meters under the sea surface, this will no longer be true when work will be conducted at higher depths ranging from two thousand to six thousand meters and in abyssal zones extending to a depth of twelve thousand meters.

Similar problems also crop up even at depths limited to a few hundreds of meters when it is desired to install more important industrial plants.

Among other difficulties, the serious dangers of asphyxiation are to be mentioned as there are risks of poisoning of any confined and inhabited atmosphere containing sources of energy such as current-generating or current storage batteries or thermal engines.

It has already been proposed to take advantage of the pressure which prevails at a subaqueous level for triggering control mechanisms or generating an impulse which is fed to a sampling device. The improved apparatus according to the invention involves a rational use of the pressure prevailing at any subaqueous level for imparting to any subaqueous plant or installation, whether stationary or movable, a reserve for supply of hydraulic energy which automatically increases with the depth at which the plant operates and which can be periodically replaced by another one from the sea level surface without presenting any of the aforesaid disadvantages while lending itself to an extremely wide range of uses.

An accumulator according to the invention essentially comprises:

(1) A substantially undistortable or invariable-volume-reservoir in which at the outset vacuum prevails or which may be filled with air or gas at a low pressure substantially equal to atmospheric pressure and which behaves as a low pressure fluid source.

Such a reservoir may be formed by a container possessing sufficient strength to withstand maximum ambient pressure or a set of containers, for example a bundle of interconnected tubes or a fluid-tight container which does not possess adequate strength to withstand ambient pressure but is filled up with bodies of suitable shape such as tubes, rings, hollow spheres or granular or other substances defining between them a maximum available volume while exerting a sufficient mechanical resistance to render the assembly practically undistorable.

(2) A distortable reservoir or a reservoir whose volume may be varied and containing a suitable volume of an appropriate motive liquid which has been selected owing to its safety and compressibility characteristics, the volume of this reservoir being approximately equal to the available space of the constant volume reservoir while behaving as a high pressure supply source.

(3) A set of ducts, valves or the like, permitting the motive liquid to be used as a power source at the outlet of the high pressure distortable reservoir and before it is forced to the low pressure undistortable reservoir in engines, nozzles, pressure amplifiers or reducers, control devices, adjusting or regulating devices and the like.

The energy is created by the pressure difference prevailing between the distortable reservoir which is subjected to the ambient hydrostatic pressure and the low pressure reservoir.

Such a source of energy also affords the dual advantage of providing a constant feed pressure for a given depth of immersion and of withstanding without being damaged high output variations, particularly those instantaneous power requirements which are very large with respect to the expected average power output.

Moreover this method of supplying energy permits the use of highly efficient volumetric engines of any scale. The total energy output of a plant according to the invention is well over 80%. This can be obtained by no other source of energy.

As increasing depths are attained by subaqueous plants, the improved accumulator provides increasing supplies of available energy which for activities such as drilling on the bottom of the sea corresponds to a compensation of the needed power increase, because, as well known, the specific energy for the destruction of a rock is in direct ratio with the rise in ambient pressure.

Thus, a volume equal to one cubic meter which, by way of example, may be represented by a sphere having a diameter equal to 124 centimeters is capable of supplying when being filled with motive power about 1,000,000 of kgm. at a depth equal to 1,000 meters and 10,000,000 of kgm. at a depth equal to 10,000 meters.

These values respectively correspond to 9.81 and 98.1 millions of joules.

Such a quantity of energy is sufficient for supplying to an engine operating at a depth of one thousand meters under the sea surface a hydraulic power equal to 1 HP or 0.736 kw. during 3 hours and 42 minutes and at a depth of 10,000 meters under the sea surface ten times as much whether reckoned in terms of power or in terms of duration.

The improved device may be, of course, simplified by omitting the distortable reservoir and the motive oil while directly admitting ambient water into the low pressure reservoir.

Such a simplification can only be recommended when dealing with very simple plants, where water, which is generally brine and often contains impurities or foreign bodies does not threaten to damage power mechanisms and to clog the receiving reservoir.

When it is desired to reload the accumulator, it is sufficient to raise the same back to the sea surface. Such a raising operation normally requires a quantity of energy similar to the energy spent on bottom.

But if an accumulator according to the invention is fitted with floats, sinkers or ballasting means, assemblies may be built which can be sunk by gravity and raised after service to the surface by dropping said ballasting means.

The use of floats or ballasting means is also useful for adjusting gravitational or lifting forces which are operative during the lowering or raising phases of the work. The relative position of the centre of gravity and the centre of buoyancy is also important because it has an influence on the stability of the entire assembly.

This operational scheme is particularly advantageous when dealing with movable plants such as independent subaqueous vehicles of any type whether floating or moving on the sea-bottom.

In such an event the ballasting means may be progressively dropped in proportion to the part of energy spent which involves a corresponding increase of the apparent specific weight of the assembly.

According to a suitable constructional form of the invention, low pressure reservoirs made of a cheap material such as granular or highly porous bodies contained in fluid-tight wrappers may be used as a ballast capable of being dropped after being filled with the power fluid.

For a better understanding of the invention, reference will now be made to the accompanying diagrammatic drawings wherein are shown by way of illustrative, but non-limitative examples, embodiments of the same.

FIGURE 1 is a diagrammatic diagram showing the main elements of a device or plant according to the invention.

FIGURE 2 is a side elevational view of an accumulator according to the invention for the servicing of an independent subaqueous plant or installation.

FIGURE 3 is a sectional view along the line A–A' in the accumulator shown in FIG. 2.

Figure 4:
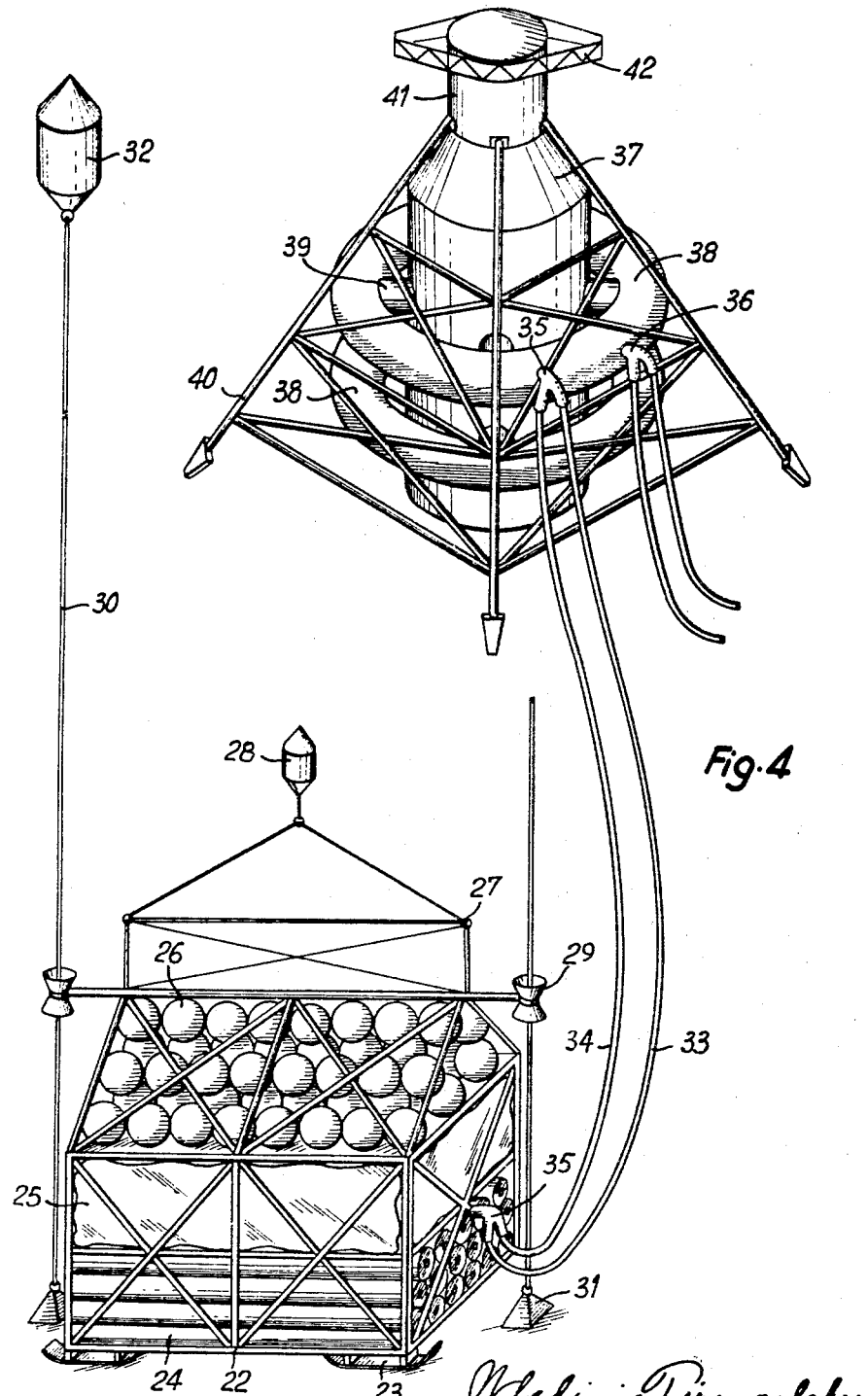
FIGURE 4 is a perspective view showing the supplying of energy by hydraulic accumulation to an independent subaqueous ground-drilling and oil-extracting plant.

In the drawing, FIG. 1, are diagrammatically illustrated the several essential and accessory elements of a hydraulic accumulator.

The low pressure undistortable reservoir may comprise one or several containers having a spherical, a cylindrical or any other suitable shape and capable of withstanding an outer pressure without any substantial loss of its inner volume. These containers may comprise recesses or cavities protected by a simple or complex stress-resisting wall or alternatively may have a cellular structure made up of inter-communicating alveoli providing adequate overall volume.

The inside of the reservoir may be also filled with stress-resisting elements such as solid or hollow spheres, rings or other bodies made of metal, natural or synthetic rock or stone or other equivalent substances providing adequate porosity in the piled up assembly while being able to withstand mechanical pressure and while being exteriorly protected by distortable but sufficiently resistant and impervious walls for preventing any ingress of the outer liquid.

A volume of liquid suitable for power transmission such, for example, as oil is contained in the variable volume expansible and contractible chamber reservoir 2 containing the motive fluid having a varying volume from which the fluid is expelled toward reservoir 1 by the action of the ambient subaqueous pressure.

The expulsion of the pressure motive fluid may be effected by displacing a movable partition such as a piston or ram through a conveniently sized cylindrical chamber or alternatively by an extrusion process responsive to the distortion of a flexible wall.

Where the ambient liquid is directly used as a power fluid, the reservoir 2 may be replaced by a device for purifying the liquid as it enters the apparatus.

A duct manifold 3 directly or indirectly interconnects the reservoirs 1 and 2.

Electrical conductors 4 connect the devices for distributing or utilizing the power fluid and the control board which may operate automatically or non-automatically.

Reference numeral 5 designates the diagrammatic illustration of the power elements. These elements may be engines or hydraulic devices of various types whether of the rotating, reciprocating, percussive, vibrating or other type.

The motive pressure may be directly used in power amplifiers or reducers of any suitable type providing the transmission to a suitable fluid or to the liquid derived from the surrounding space a pressure differing from the motive presure.

Numeral 6 designates diagrammatic representation of several control devices, relays or servo-devices for carrying out the several operations.

All steps such as position adjustment measures, opening or closing of the several valves are affected by deriving power from the system of motive sources 1 and 2.

A check valve 7 is used for eventually forcing (during the raising step) the fluid contained in the reservoir 1 back into the reservoir 2 due to the action of those gases which may be contained in this reservoir and which were compressed during the operation of the device.

Control station 8 is for the devices 5 and 6 which record and emit the information which may be remotely guided from the sea surface or from an immersed base or alternatively which may operate automatically, depending upon the position of the apparatus, the depth attained, the time elapsed, etc.

The control station 8 may be, if necessary, provided with energizing members such as electrical generating or storage batteries and it may also use the generated motive power for its own supply.

The assembly may be lowered by means of a carrier cable connected to a remote guiding wire or may be completely autonomous.

Ballasting system 9 is adapted to compensate for the total weight either when lowering or when raising the rigging also to modify the apparent density during the operation of the apparatus. The ballasting units may be eventually dropped either progressively or bodily at a preset time during the operation.

Float 10 is adapted to compensate, where necessary, for the total apparent density whether when lowering or when raising the rigging.

In the showing of FIG. 2 is represented in diagrammatic fashion an independent unit for research work at great and very great depths, such as measuring, sampling liquids or solids whether on the surface of the sea bottom or underground, and also taking photographs or shooting films, etc.

This unit comprises a low pressure tubular battery 11 which can be economically built by using conventional tubes, a resilient container 12 containing the motive fluid, a frame 13, a suspension hook 14, a ballast 15 which may be entirely or sequentially dropped batchwise, compensating floats 16, jacks 17 for automatically adjusting horizontality, sustaining shoes 18 mounted upon the adjustable jacks 17, a servo-control and sampling unit 19, and a station 20 for photography and registry. The electric current which feeds this unit may be supplied by a set of batteries incorporated with the apparatus or alternatively by a generator fed by the energy supplied by the unit. An automatic block 21 for taking samples by a picking up or coring operation is also provided.

In the showing of FIGURE 3 is repreesnted for the sake of a better understanding of FIGURE 2 a cross section along A—A'. This representation shows the tubular battery 11, the reservoirs 12, the floats 16 and the ballast 15.

Dimensions of the device:

A low pressure reservoir such as the one shown in FIGS. 2 and 3 made up of nine cylindrical lengths each having five meters, a diameter equal to 114 millimeters and a thickness equal to 11 millimeters has an efficient volume of 300 liters. A power supply of 5.5 H.P. per hour is thus available i.e. 4 kwh. at a depth of 5,000 meters or 11 H.P. i.e. 8 kwh. at a depth of 10,000 meters. This amount of energy is amply sufficient for performing significant working operations.

Where steel is used as a material, the weights and volumes of such a plant can be estimated as indicated in the following table.

|  | Weight in kilog. | Average density | Volume in liters |
|---|---|---|---|
| Low-pressure reservoir (when empty) | 1,350 | 2.93 | 461 |
| Wall of the reservour containing the motive fluid | 300 | 3.00 | 100 |
| Motive fluid | 255 | 0.85 | 300 |
| Power elements and equipment | 500 | 4.00 | 125 |
| Frame | 1,000 | 7.85 | 127 |
| Total | 3,405 |  | 1,113 |

Therefore the assembly has amidst the mass of water an apparent weight approximately equal to 2,300 kilograms. After the flow of 300 liters of motive fluid through the low pressure reservoir, the volume is reduced to 813 liters while the apparent weight rises to 2,600 kilograms.

Where it is desired that the apparatus enjoys, when operating on bottom, and while work is being performed, an efficient weight equal to about 700 kilograms and when raising the rigging, after dropping a ballast, a lifting power equal to 300 kilograms, it is sufficient to provide it with a float having a buoyancy of 2900 kilograms and a ballast having an apparent weight equal to 1600 kilograms.

Where it is desired to slow down the lowering or raising operations of the rigging, it is sufficient to add supplementary floats which are automatically dropped after being laid upon the bottom of the working site or when nearing the sea surface.

Such floats may be simultaneously used for announcing the proximate reaching of the bottom of the working site or the sea surface and are capable of raising up to the sea surface a portion of the collected samples or information.

When using light alloys, the overall weight of the assembly may be substantially reduced.

In the showing of FIG. 4 is represented the power feed for a drilling plant or an independent central station immersed at a depth of 3000 meters.

22 designates the frame of an accumulator cell. 23 diagrammatically designates the shoes or skids of the assembly. 24 is the low pressure reservoir constituted by a tubular battery. 25 is the high pressure reservoir made up of flexible containers. 26 is a set of floats for compensating weight and procuring balance. 27 designates suspension hooks or rings. 28 is a positioning float for a fishing sling. 29 designates guides trumpets for lowering and raising the rigging. 30 designates guiding cables or guys anchored to the ground as shown at 31 and held under tension by the floats 32 which are near the sea surface. 33 and 34 designate flexible conduits for connecting the hydraulic accumulator battery with the immersed plant. 35 designates the unions connecting 33 and 34 with the plant and battery respectively. 36 is a relay joint tapped to a second battery. 37 is the central body of the immersed working station. 38 designates O-shaped ducts surrounding the body 37 and connected thereto by stub pipes 39. 40 is the stability framework. 41 and 42 represent the lock chamber or coffer associated with the connecting platform through which access to and from the plant is possible.

*Operation of the plant*

It is assumed that the plant is entirely independent. Connection is ensured by small boats known as "saucers" or pocket submarine boats which enter the plant or come out of the plant through a lock chamber or coffer provided in the head 41.

Around the station are arranged several pairs of guiding cables such as 30 along which batteries such as the one shown in FIG. 4 may be lowered under the guidance of removable guides such as those designated by 29.

Once the battery has been set into operative position, the double union such as 35 of a pair of flexible ducts such as 33 and 34 is tapped to it owing to an automatic connector device or by resorting to a robot device or an inhabited operational vehicle.

When a battery is exhausted, it can be raised up to the sea surface by a specially equipped ship and automatically recharged by emersion or eventually, where this is found necessary, by injection of air or a suitable gas into the low pressure reservoir so as to drive the motive fluid towards the reservoirs 2.

*Numerical example*

At a depth of 2000 meters, each H.P. needs a depression volume equal to 135 liters. Assuming the average continuous consumption to be equal to 400 H.P. i.e. 300 kw. which is amply sufficient for a drilling plant operating at a depth ranging from 2000 to 3000 meters. The daily reserve of volume is approximately equal to 1300 cubic meters. This corresponds to a spherical reservoir having a diameter equal to 14 meters or its equivalent having another form, for example a bundle comprising about 500 10¾" tubes and a length of 50 meters. Such a bundle of tubes can be circumscribed by a rectangle having 10 meters x 3.5 meters surmounted by a reservoir of equal volume containing motive fluid, thereby making its towage and immersion possible. Such units may be clustered into rafts.

With the aid of seven bundles or spheres of this type, an adequate weekly power supply may be obtained.

The manufacturing costs of such an equipment are not larger than those of a marine platform as used at the present time when working at a small depth.

Modifications are conceivable within the field of technical equivalencies without departing from the scope of the following claims.

What is claimed is:

1. A subaqueous hydraulic energy accumulator for producing usable energy by utilizing ambient hydraulic pressure comprising, in combination, a low pressure reservoir having an internal pressure lower than the ambient hydraulic pressure and having an inlet, and hydraulically operated energy producing means having an outlet communicating with said reservoir inlet and an inlet subjected to hydraulic pressure produced by the ambient hydraulic pressure surrounding said accumulator whereby the flow of hydraulic fluid through said energy producing means into said reservoir energizes said energy producing means.

2. In a hydraulic energy accumulator as in claim 1 wherein said reservoir comprises a stress-resisting container.

3. In a hydraulic energy accumulator as in claim 1 wherein said reservoir comprises a plurality of stress-resisting containers, and means establishing intercommunication between said containers.

4. In a hydraulic energy accumulator as in claim 1 wherein said reservoir comprises a fluid tight container, and a substantially non-compressible porous material within said container.

5. In a hydraulic energy accumulator as in claim 1, a float and sinkable ballasts mounted upon said accumulator so as to balance the accumulator during lowering, bottom operation and raising of the accumulator.

6. In a hydraulic energy accumulator as in claim 1, filter means associated with said energy producing means inlet filtering the hydraulic fluid entering said energy producing means.

7. In a hydraulic energy accumulator as in claim 1, an expansible and contractible chamber reservoir having an outlet, a hydraulic fluid within said expansible and contractible chamber reservoir, said chamber reservoir being directly subjected to the ambient hydraulic pressure whereby the pressure of said hydraulic fluid within said chamber reservoir is produced by the ambient hydraulic pressure, said chamber reservoir outlet communicating with said energy producing means inlet.

8. In a hydraulic energy accumulator as in claim 7, conduit and valve means selectively establishing communication between said reservoirs whereby fluid may flow from said low pressure reservoir to said chamber reservoir upon said accumulator being raised to the water surface.

9. A subaqueous portable hydraulic energy accumulator comprising, in combination, a low pressure reservoir filled with low pressure gas, an expansible and contractible chamber reservoir filled with a hydraulic fluid and directly subjected to the ambient hydraulic fluid, a conduit interconnecting said reservoirs, and hydraulically operated energy producing means disposed within said conduit whereby fluid flow from said chamber reservoir to said low pressure reservoir energizes said energy producing means.

10. In a potrable hydraulic energy accumulator as in claim 9, means connected to said accumulator selectively lowering and raising said accumulator.

11. In a portable hydraulic energy accumulator as in claim 9, valve means selectively establishing communication between said reservoirs and control means connected to said valve means.

12. In a portable hydraulic energy accumulator as in claim 9 wherein said low pressure reservoir comprises a fluid tight container, and a substantially noncompressible porous material within said container.

References Cited

UNITED STATES PATENTS 3,065,162   11/1962   Hub _____ 60—35 X

DAVID J. WILLIAMOWSKY, *Primary Examiner.*

J. KARL BELL, *Assistant Examiner.*